(12) United States Patent  
Wong

(10) Patent No.: US 8,510,788 B2
(45) Date of Patent: Aug. 13, 2013

(54) BUILD PROFILE FOR A SET-TOP BOX

(75) Inventor: Kan Man Wong, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 882 days.

(21) Appl. No.: 12/617,671

(22) Filed: Nov. 12, 2009

(65) Prior Publication Data

US 2011/0113463 A1 May 12, 2011

(51) Int. Cl.
*H04N 7/173* (2006.01)
*G06F 9/00* (2006.01)

(52) U.S. Cl.
USPC .......... 725/132; 717/100; 717/162; 717/174; 713/1; 713/2

(58) Field of Classification Search
None
See application file for complete search history.

(56) References Cited

U.S. PATENT DOCUMENTS

| | | | |
|---|---|---|---|
| 6,789,157 B1 * | 9/2004 | Lilja et al. | 711/103 |
| 7,243,337 B1 * | 7/2007 | Cowan | 717/127 |
| 7,331,046 B2 * | 2/2008 | Shida et al. | 717/162 |
| 7,454,603 B2 * | 11/2008 | Stevens et al. | 713/1 |
| 8,086,833 B2 * | 12/2011 | Stevens et al. | 713/1 |
| 2002/0104078 A1 * | 8/2002 | Shann et al. | 717/162 |
| 2003/0154368 A1 * | 8/2003 | Stevens et al. | 713/1 |
| 2003/0219081 A1 * | 11/2003 | Sheehan et al. | 375/316 |
| 2004/0055000 A1 * | 3/2004 | Miyake et al. | 718/105 |
| 2004/0215908 A1 * | 10/2004 | Zimmer et al. | 711/163 |
| 2005/0010911 A1 * | 1/2005 | Kim et al. | 717/140 |
| 2005/0015582 A1 * | 1/2005 | Shida et al. | 713/2 |
| 2008/0086629 A1 * | 4/2008 | Dellow | 713/2 |
| 2009/0006832 A1 * | 1/2009 | Stevens et al. | 713/1 |
| 2009/0265736 A1 * | 10/2009 | Son | 725/37 |
| 2010/0122197 A1 * | 5/2010 | Fujioka | 715/769 |
| 2011/0029761 A1 * | 2/2011 | Sung et al. | 712/228 |

FOREIGN PATENT DOCUMENTS

WO     WO 9728499 A1 *   8/1997

* cited by examiner

*Primary Examiner* — Steven Snyder
(74) *Attorney, Agent, or Firm* — Seed IP Law Group PLLC

(57) ABSTRACT

One embodiment of the present disclosure takes the form of a method for generating a profile of a build program for one or more set-top box platforms supported by a satellite distribution system. The one or more build profiles may maintain information about the one or more the modules and sub-modules of the build program, including but not limited to a memory address indicating the location of each module of the build program in the memory components of the set-top box. In another embodiment, the build profile may also maintain the relative offset address of each module of the build program from the beginning of the build program, an indicator of each module and sub-module and the amount of memory that each module comprises when stored in memory.

22 Claims, 7 Drawing Sheets

| Address | Offset | Size (Bytes) | Item |
|---|---|---|---|
| \multicolumn{4}{c}{Boot Recovery Module} | | | |
| BD000000 | 1000000 | | Top Flash |
| BCFFFECC | FFFECC | 308 | Boot Recovery Header |
| BCFE000 | FE0000 | 130,764 | Boot Recovery Software |
| \multicolumn{4}{c}{Root File System} | | | |
| BCD00000 | D00000 | 3,014,656 | Root File System |
| \multicolumn{4}{c}{Kernel} | | | |
| BCC20000 | C20000 | 917,504 | Kernel |
| \multicolumn{4}{c}{Boot Loader} | | | |
| BCC00000 | C00000 | 131,072 | Boot Loader |
| \multicolumn{4}{c}{Main Code} | | | |
| BCBFFCD4 | BFFCD4 | 812 | Application Header |
| BC080000 | 80000 | 12,057,812 | Application |
| BC040000 | 40000 | 262,144 | Extended Flash Filesystem |
| BC000000 | 0 | 0 | Flash Base |

Fig. 5

BUILD PROFILE FOR A SET-TOP BOX

TECHNICAL FIELD

The present invention relates generally to satellite distribution systems, and more particularly to generating one or more profiles of a build program for constructing or updating the operation system of one or more set-top box platforms of the satellite system.

BACKGROUND

A satellite or digital cable distribution system may provide television programs to subscribers of the distribution system. Typically, satellite and digital cable distribution systems include a set-top box that receives and decrypts the television signal such that a television program may be viewed by the user. In many satellite distribution systems, the television signal may be broadcast by a satellite, received by a satellite dish antenna and decoded by the set-top box. In digital cable systems, the television signal is typically transmitted to the user through a cable connected directly to the set-top box.

Generally, set-top boxes of satellite systems include an operational program that provides a user interface to the user of the set-top box as well as manages and coordinates the activities and sharing of the resources of the set-top box. The operational program of the set-top box is similar to operational programs of other typical computing devices, such as personal computers or laptops. As part of the operation program, a start-up sequence of instructions, or build program, is typically included that is executed upon start-up of the set-top box. The build program typically opens communications with the various components of the set-top box, as well as provides the software structure on which the operational software of the set-top box may execute.

The contents of any one build program for a set-top box may depend on the hardware components associated with the set-top box and the operating platform of the box. For example, some set-top boxes of the system may include 32 megabytes of memory, while other set-top boxes may include 16 megabytes of memory. In addition, some set-top boxes may include hardware components not present in other set-top boxes, such as a digital video recorder (DVR) incorporated into the box or hardware providing the functionality to receive and provide high-definition television and video. Further, some set-top boxes may include similar hardware, but may run different operating programs from similarly structured set-top boxes. Thus, for a satellite system that supports several different types of set-top boxes, several build programs may be designed to support each type of box such that each set-top box can properly receive and decode the transmitted television signal.

BRIEF SUMMARY

Software builds for the various types of set-top boxes of a satellite distribution system are typically installed in the set-top boxes prior to deployment of the boxes into the field, although some set-top boxes may be updated with new build software by receiving the new build program over the satellite distribution system. However, once the build program is installed, very little may be known about the actual construction and installation of the build program. For example, the build program may be loaded into the memory of the set-top box over a particular range of memory addresses, but such addresses may not be know to an engineer or computing device for troubleshooting or updating purposes. Thus, what is needed is a method to maintain a profile of the build programs for the various set-top box platforms supported by the satellite system such that the build programs may be generated and updated simply and that information about the software of a set-top box may be analyzed quickly.

One embodiment may take the form of a method for creating a build program for a set-top box of a television system. The method may comprise the operations of identifying one or more software modules comprising a build program for a set-top box and creating a build profile indicating at least a relative offset address for the one or more software modules from the beginning of the build program. The method may further include the operations of compiling the build program based on the build profile and loading the build program into a memory component of the set-top box.

Another embodiment may take the form of a method for updating a build program stored in a memory component of a set-top box. The method may comprise the operations of storing a build program configured to provide a boot protocol for the set-top box in a computer-readable storage medium of the set-top box and generating a build profile indicating information about the build program. The method may further include the operations of receiving an update to the build program, the update comprising one or more updated software modules and updating the build program based on the build profile.

Yet another implementation may take the form of a system for updating the operating program of a receiver comprising a headend configured to provide an update of the operating program to the receiver comprising a plurality of software modules and a satellite interface coupled to the receiver configured to receive the update of the operating program from the headend. Further, the system includes a machine-readable storage medium coupled to the receiver and configured to store a machine-executable code that, when executed by the receiver, causes the receiver to perform several operations. The operations performed by the receiver include receiving the update of the operating program of the receiver, generating an operating program profile indicating information about the operating program such as the memory addresses for the plurality of software modules and the byte size of the plurality of software modules and updating the operating program of the receiver based on the operating program profile.

BRIEF DESCRIPTION OF THE DRAWINGS

FIG. 5 is a table illustrating an exemplary build profile of a build program of a set-top box of a satellite distribution system.

DETAILED DESCRIPTION

One embodiment of the present disclosure takes the form of a method for generating a profile of a build program for one or more set-top box platforms supported by a satellite distribution system. The one or more build profiles may maintain information about the one or more the modules and sub-modules of the build program, including but not limited to a memory address indicating the location of each module of the build program in the memory components of the set-top box. In another embodiment, the build profile may also maintain the relative offset address of each module of the build program from the beginning of the build program, an indicator of each module and sub-module and the amount of memory that each module comprises when stored in memory.

The build profile may be utilized by the satellite distribution system in several ways. For example, during generation of the build program, one or more computer programmers may utilize the information stored in the build profile to manage and determine the location of the modules that comprise the build program. In this respect, the build profile may act as an assessment system to verify the location and inclusion of the modules of the build program during generation of the program. In another example, the build profile may be utilized by a set-top box to update an existing build program stored within the memory of the set-top box. The updated build program and build profile may be received through the satellite system to update the build program with one or more new modules. In this manner, build profiles of the one or more set-top box platforms that are supported by the satellite system may aid the satellite distribution system in generating and updating the build programs of the set-top boxes.

Figure 1:
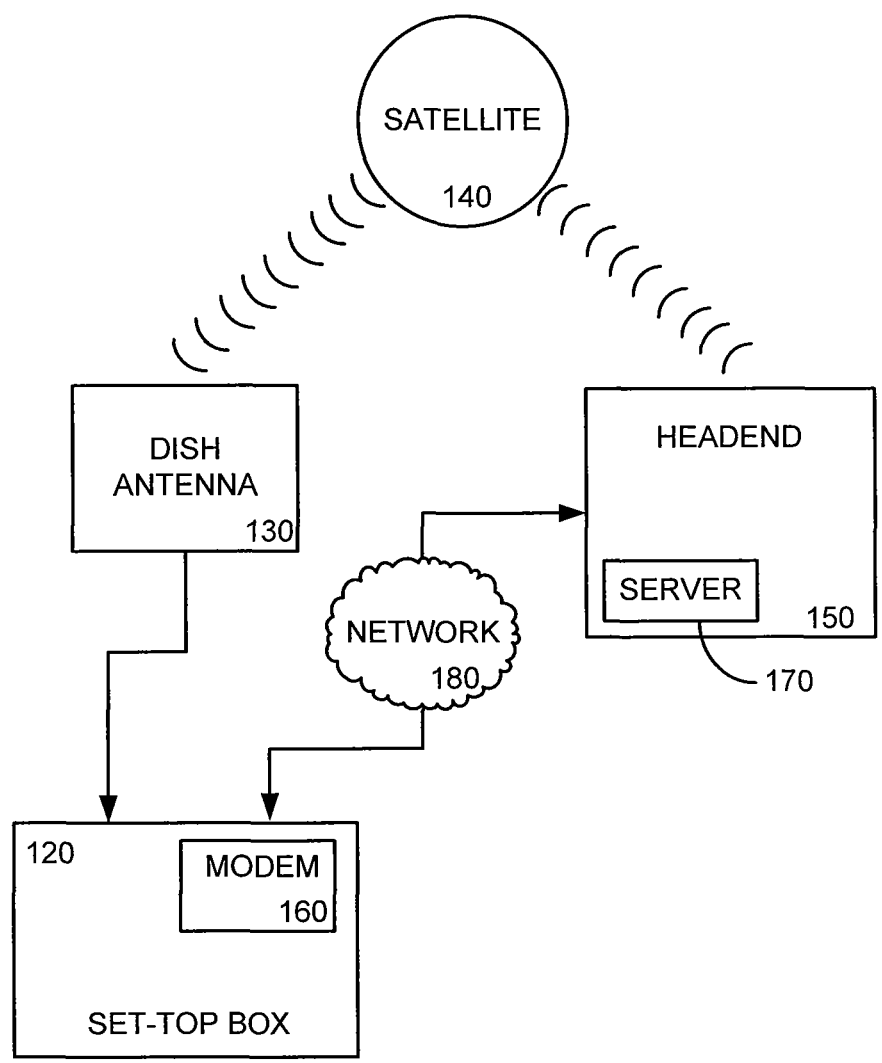
FIG. 1 depicts a first embodiment of a satellite distribution system that may utilize a build profile to generate or update a build program for a set-top box for the system.

FIG. 1 depicts a first embodiment of a satellite distribution system that may utilize a build profile to generate or update a build program for a set-top box for the system. The satellite system of FIG. 1 is but one example of a system that may utilize a build profile. Alternatively, a digital cable satellite system or any other television system may also utilize the embodiments described herein. Further, while the embodiments of the present invention are described in relation to a build program of a set-top box, it should be appreciated that the build profile may be utilized to generate or update a build program for any computing device. For example, a cell phone device may include a build program stored on the memory of the phone. To update the cell phone device, a build profile may be generated that maintains information concerning the modules of the build program, as well as the memory address or relative offset for each module. Generally, a build profile may be generated and utilized for the operating system of any computing device, including but not limited to, a global positioning system controller, a game console, a cell phone device, a personal digital assistant (PDA) and any other device including an embedded operating program.

The television system of FIG. 1 may include a set-top box (STB) 120 configured to provide a user with an interface to the television system. As described above, the STB 120 of the system may receive an encrypted television signal and convert it into a signal that a user's television may recognize in order to display it to the user. Further, the STB 120 may provide the converted signal to a display device, such as a television or computer screen, for display to the user. In one implementation, the STB 120 may receive the encrypted signal from a satellite 140 or through a digital cable or network connection. Further, in the satellite and digital cable configurations, the encrypted television signal may be generated by a headed 150 and transmitted to the STB 120. Generally, the headend 150 may be a master facility that receives television signals for processing and distribution to various television systems. In a satellite television provider, the headend 150 may transmit the audio/visual signal to a satellite 140 for redistribution to subscribers. Upon receipt, the satellite 140 may transmit the signal to a dish antenna 130 connected to the STB 120 for decryption.

In a cable television system configuration, the headend 150 may transmit the television signal directly to the STB 120 over a cable network connection. For example, the signal may be provided to the STB 120 through a dedicated cable connected between the STB 120 and the headend 150. Alternatively, the signal may be provided over a network 180 connection, utilizing a modem 160 associated with the STB 120. Additionally, the headend 150 may utilize the network 180 to provide other communication signals to the STB 120. For example, the headend 150 may utilize a server 170 in communication with the headend and the network 180 provide programming updates to the STB 120 over the network connection. Further, the STB 120 may also communicate over the network 180 connection to provide information to the headend 150 or to store information within the network 180 itself.

Figure 2:
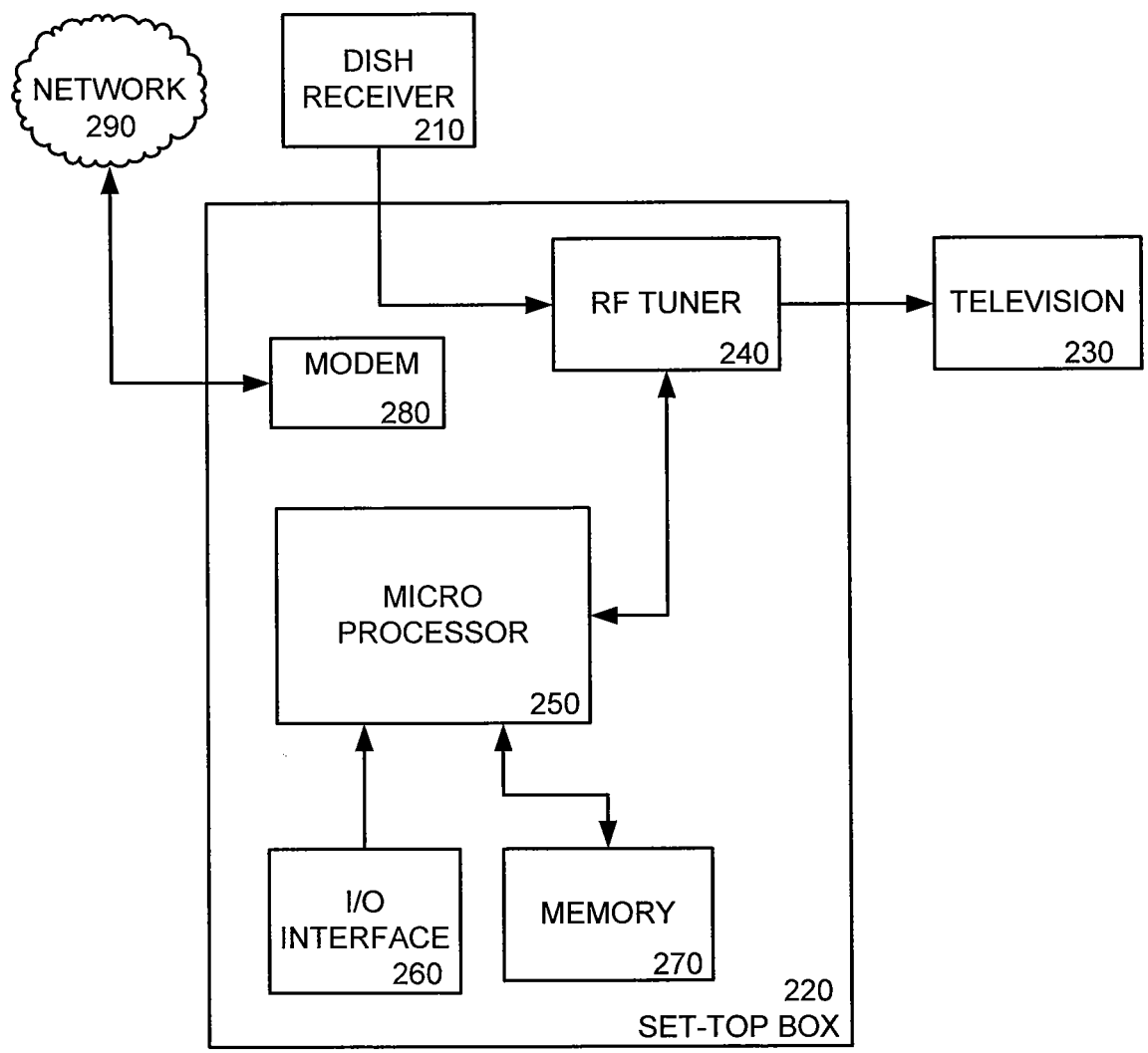
FIG. 2 is a block diagram illustrating an example of a set-top box which may be used in implementing embodiments described herein.

FIG. 2 is a block diagram illustrating an example of a STB 220 which may be used in implementing embodiments described herein. The STB 220 may receive a transmitted television signal from a satellite dish receiver 210 and may transmit a translated signal to a user's television 230 for display to the user. The television signal may be received at the STB 220 by a radio frequency (RF) tuner 240. The RF tuner 240 may translate the received signal and provide that signal to the user's television 230. Although not shown, the satellite dish receiver 210 may include a low noise block (LNB) or other components to decrypt and transmit the received television signal. Similarly, the STB 220 may include more or fewer components as those shown Further, the STB 220 may include a software operating program that provides a user interface to the user of the television system as well as manages and coordinates the activities and sharing of the resources of the STB. As described in more detail below, the STB may utilize a microprocessor 250 coupled to memory 270 components of the STB to execute the operating program. The memory component 270 of the STB 220 may include a dynamic storage device, a random access memory (RAM) or other devices coupled to the STB for storing information and instructions to be executed by the microprocessor 250. Memory 270 may also include a flash memory component that is used for storing temporary variables or other intermediate information during execution of instructions by the microprocessor 250. As explained in more detail below, the flash memory component of the memory 270 may also store a build program that is loaded into the STB 220. The build program may be received from the satellite system or by installing the build program prior to deployment of the STB.

The set-top box may also include an input/output (I/O) interface 260 to interface one or more I/O bridges or I/O devices. I/O devices may also include an input device (not shown), such as an infra-red signal provided by remote control device or alphanumeric input device, including alphanumeric and other keys for communicating information and/or command selections to the microprocessor 250. The I/O device may be utilized by a user to provide inputs and commands to the STB 220 to control the interface. Inputs may also be received from a network 290 through a modem 280 coupled to the STB 220. The modem 280 may be connected to the STB 220 through the I/O interface 260 or may be integrated within the STB 220. The modem 280 may also be configured to communicate over the network 290 to provide and receive information and commands from the network.

According to one embodiment, the implementations described below may be performed by a STB 220 in response to the microprocessor 250 executing one or more sequences of one or more instructions contained in memory 270. These instructions may be read into memory 270 from another machine-readable medium, such as a storage device. Execution of the sequences of instructions contained in memory 270 may cause the microprocessor 250 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as memory 270. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Figure 3:
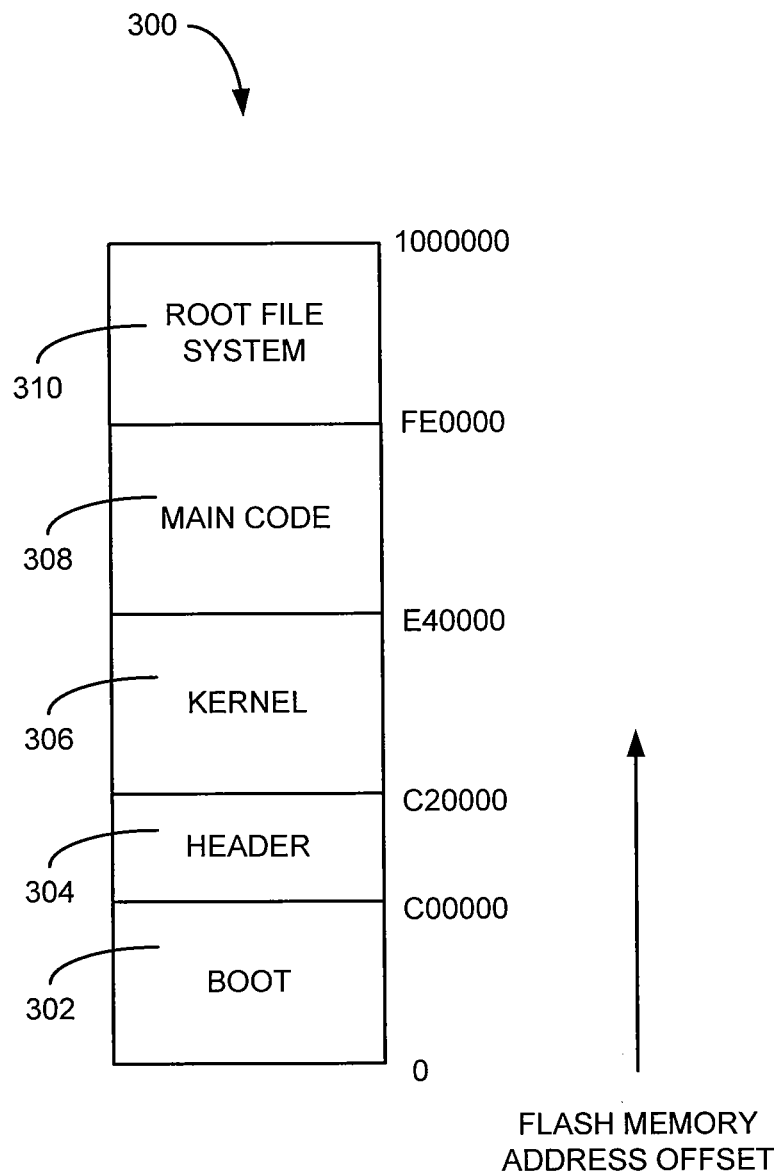
FIG. 3 is a block diagram of a build program for a set-top box of a satellite distribution system, including the various modules that comprise the build program and the relative memory address offset for each module.

As mentioned above, a STB 220 of a satellite distribution system may include an operating program stored in the memory 270 of the STB that provides a user interface to the user of the set-top box as well as manages and coordinates the activities and sharing of the resources of the set-top box. Included in the operating program may be a build program that initializes the components of the STB 220 and generally prepares the STB for use by a user. FIG. 3 is a block diagram of a build program 300 for a set-top box of a satellite distribution system. The build program 300 includes various modules 302-310 that are executed by the microprocessor of the STB upon start-up of the STB. Generally, the STB executes the build program 300 from the start of the boot module 302 of the build program automatically upon start-up. Further, the modules are often executed in order, unless a header module 304 directs the program to another module within the program. If the build program 300 is missing or corrupted, the STB fails to boot up such that the STB is unusable as a computing device.

The exemplary build program 300 shown in FIG. 3 includes five modules, namely a boot module 302, a header module 304, a kernel module 306, a main code module 308 and a root file system module 310. While five modules are shown, the build program 300 may include any number of modules. The modules of the build program 300 contain software instructions that, when executed, begin the initiation of the STB for use by the satellite system. For example, the boot module 302 may include the boot sequence, which is the initial set of operations that the STB performs upon power up to load the operating system for the STB. Further, the modules of the build program 300 are designed for the particular platform of the STB. For example, the STB may include certain hardware components, such as a DVR or HD components, that are initiated upon start-up. Further, the STB may include certain functionality, such as the ability to download content from a server of the satellite system. Generally, the build program is associated with each separate STB platform of the satellite system. Thus, depending on the platform of the STB, the build program 300 for any particular STB may include more or fewer modules corresponding to the functionality of the STB.

FIG. 3 also includes the relative offset memory address position for each module 302-310 of the build program 300. While the relative offset address of each module is generally not included in the build program, such information may be maintained in a build profile of the build program and may be useful when generating or updating the build program. The relative offset is shown in FIG. 3 as a hexadecimal number associated with the size (in bytes) of each module of the build program 300. Hexadecimal memory addresses are used herein, although any mode of indicating memory address positions may be used with the embodiments discussed herein.

In the example shown in FIG. 3, the composite build program 300 occupies 1000000 hexadecimal bytes of information, defined by five modules 302-310 of the build program. In particular, a boot module 302 occupies C00000 bytes of information, a header module 304 occupies 20000 bytes of information, a kernel module 306 occupies 220000 bytes of information, a main code module 308 occupies 1A0000 bytes of information and a root file system module 310 occupies 20000 bytes of information. When combined, the modules 302-310 comprise the build program 300. The relative offset address may begin at the boot module 302 such that the relative offset address for the boot module is 0. The relative offset address of each subsequent module 304-310 is determined from the beginning of the boot module 302. As such, the header module 304 may be located and have a relative offset address of C00000 bytes into the build program, the kernel module 306 may be located C20000 bytes into the build program, the main code module 308 may be located E40000 bytes into the build program and the root file system module 310 may be located FE0000 bytes into the build program. As discussed in more detail below, this information may be stored in a build profile for use by a computer programmer or the STB when updating or generating the build program.

Figure 4:
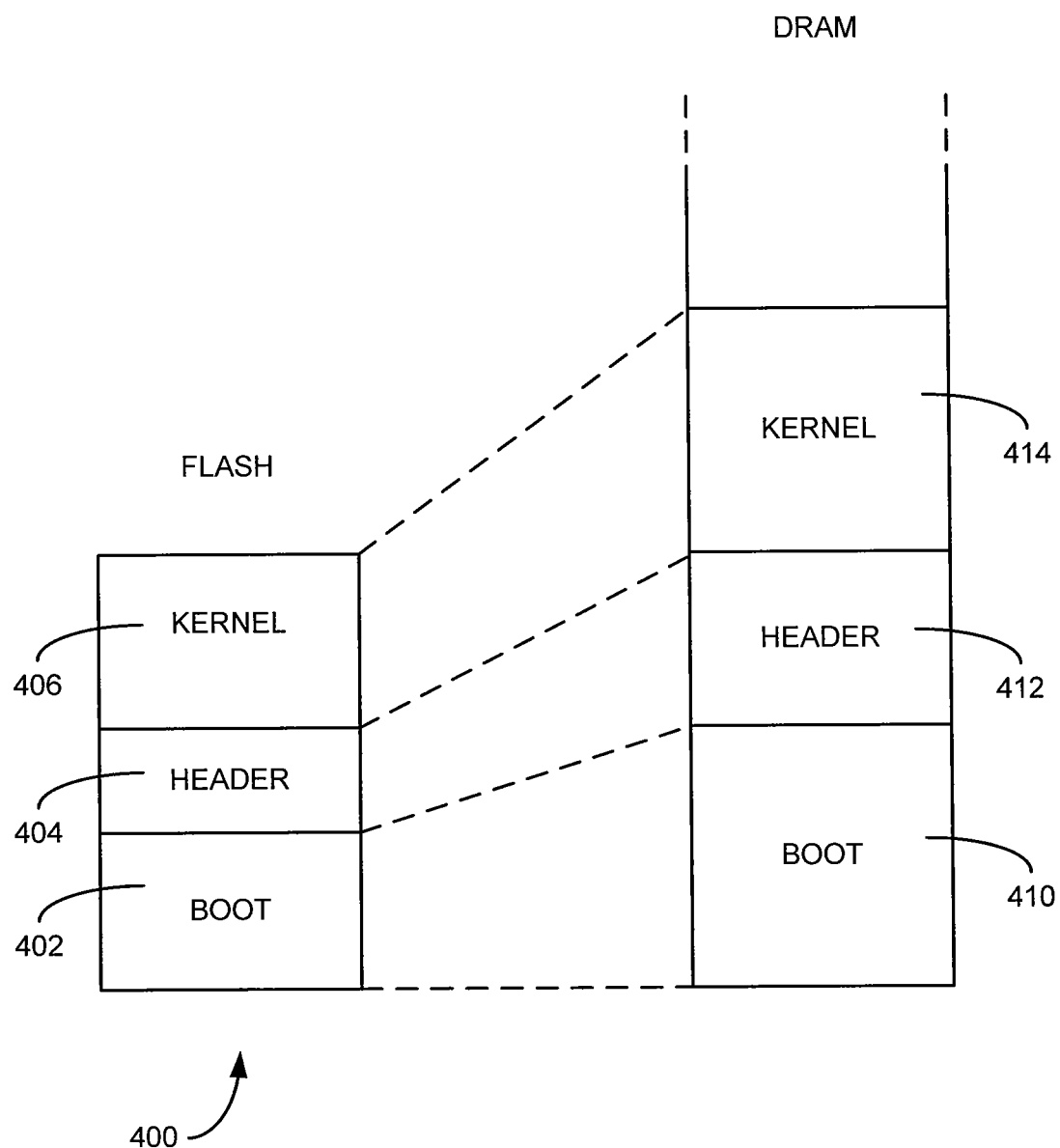
FIG. 4 is a block diagram illustrating the transfer of a build program from flash memory to DRAM component of a set-top box of a satellite distribution system.

Generally, to load the build program into the STB, the build program is first stored in a flash memory component of the STB and then transferred to one or more DRAM components of the STB. FIG. 4 is a block diagram illustrating the transfer of a build program from flash memory to DRAM memory of a STB. As shown, the build program 400 stored in the flash memory comprises three modules, namely a boot module 402, a header module 404 and a kernel module 406. The boot program 400 may be uploaded to the flash memory in a variety of ways. In one embodiment, the boot program 400 is loaded into the flash memory during manufacture of the STB device. In another embodiment, the boot program 400 is loaded into flash memory by downloading the program from a separate device, such as from a server over a network connection, from a USB drive connected to the STB or from the satellite distribution system. Generally, the STB may receive the boot program 400 in any manner.

From the flash memory, the build program 400 may be loaded and stored in one or more DRAM components of the STB. Thus, upon loading, the DRAM component may include a boot module 410, a header 412 and a kernel module 414 that correspond to the respective modules 402-406 of the build program 400 stored in the flash memory. Upon start-up of the STB, the microprocessor of the STB may access and execute the various modules 410-414 of the build program from the DRAM component such that the STB may be operated by a user. In some embodiments, the build program 400 is loaded and stored into the DRAM components of the STB upon each start-up of the STB.

In addition, the various modules 402-406 of the build program 400 stored in the flash memory may be compressed to fit within the available flash memory space. In many STBs, the DRAM memory may contain more available space to store information than the flash memory. Thus, various modules of the build program 400 may be compressed when stored in the flash memory. Any type of compression algorithm may be used that is recognized by the STB, including but not limited to Lempel-Ziv-Markov algorithm (LZMA) compression, GZIP compression or any other type of data compression. Further, each module of the build program 400 may be compressed with a separate compression algorithm, such that some modules are compressed with one algorithm while others are compressed using a different scheme. Upon transfer into the DRAM memory of the STB, the modules 410-414 of the build program may be decompressed. Thus, when these modules are transferred to the DRAM components, the modules may encompass more bytes of DRAM than within the flash memory.

FIG. 5 is a table illustrating an exemplary build profile 500 for a build program of a set-top box of a satellite distribution system. The build profile 500 may include information about the modules of the build program, including relative offsets for each module and/or specific DRAM memory addresses. This information may be used by the satellite system or computer programmer when generating or updating a build program for a particular STB platform.

Generally, the build profile 500 includes information about the build program in a text or other file that may be analyzed by a computing device. For example, the build profile 500 of FIG. 5 includes five modules 510-518 as indicated by the bold titles within the build profile, namely a main code module 518, a boot loader module 516, a kernel module 514, a root file system module 512 and a boot recovery module 510. Further, each module of the build program may include sub-modules that further define the content of each module. The sub-modules are included in the fourth column 508 of the build profile 500. For example, the main code module 518 of the build profile 500 includes an application header 520, an application 522 and an extended flash filesystem 524. A flash base 526 indicating the beginning of the build program may also be indicated by the build profile 500.

Each module and sub-module of the build profile 500 encompasses a particular amount of memory space, as indicated by the rows of the build profile. More particularly, a first column 502 of the build profile 500 provides the absolute flash memory address for each sub-module of the build program, a second column 504 provides a relative offset address from the beginning of the build program for each sub-module and a third column 506 provides the size in bytes of each sub-module of the build program. Thus, the particular size of each sub-module, including the amount of memory space that each sub-module may occupy within the flash memory component, is indicated by the third column 506. For example, kernel portion 528 of the kernel module is 917,504 bytes long, as indicated by the third column 506 of the row indicating the kernel module.

The build profile 500 also includes information about the relative offset address for each sub-module, as well as the absolute memory address in flash memory of each sub-module. The relative offset address is provide in the second column 504 of the build profile and represents the location of each sub-module within the build program. For example, the root file system module 512 begins at memory location D00000 of the build program while the boot recovery software sub-module 530 of the boot recovery module 510 begins at memory location FE0000. In this manner, each sub-module of the build program begins at a specific memory location from the beginning of the build program (memory offset location 0), indicated in the build profile 500 as the flash base 536. In addition, each sub-module of the build program may also have an associated flash memory address location. In the example shown, the build program is stored in flash memory locations BC000000 to BD000000, as shown in the first column 502 of the build profile. In addition, a flash memory address for each sub-module is also included. Thus, the application header sub-module 520 of the main code module 528 is located in memory address BDBFFCD4 in the flash memory component of the STB.

In this manner, the build profile 500 maintains information about a build program for a platform of a STB of the satellite system. In general, the build profile 500 maintains a list of all modules and sub-modules of the build program, as indicated by the fourth column of the build profile. Further, the size in bytes of each sub-module, as well as a relative offset memory position from the beginning of the build program and an absolute address position in flash memory of each sub-module, are included and maintained by the build profile 500. For example, the boot recovery module 510 of the build program shown includes two sub-modules, the boot recovery software 530 and the boot recovery header 532. The top or end of the build program is also indicated under the boot recovery module. As shown by the build profile, the boot recovery software 530 comprises 130,674 bytes. Further, the boot recovery software 530 is offset from the beginning of the build program by FE0000 memory addresses and, based on the size of the sub-module, encompasses an offset to memory offset address FFFECC. When loaded into the flash memory component of the STB, the boot recovery software sub-module 530 of the build program encompasses the memory area defined by address BCFE000 to BCFFFECC. Similarly, the boot recovery header sub-module 532 is 308 bytes long, encompasses offset addresses FFFECC to 1000000 and flash memory addresses BCFFFECC to BD000000. As should be appreciated, the memory address and offset address may vary from build program to build program. Further, it is not required that the build program be loaded into flash memory beginning at memory location BC000000, but may be loaded at any memory location within the flash memory.

In some embodiments, as discussed above, one or more sub-modules of the build program may be compressed to fit within the available flash memory. In these embodiments, the build profile may adjust the memory address contained in the first column 502 to account for the decompressed information. Thus, the relative offset of the second column 504 may not necessarily correspond to the absolute memory address shown in the first column 502, as some sub-modules may expand in size upon decompression. Further, while not shown, the build profile may also provide a size in bytes of the sub-module in both the compressed and decompressed states for use by the STB.

Figure 6:
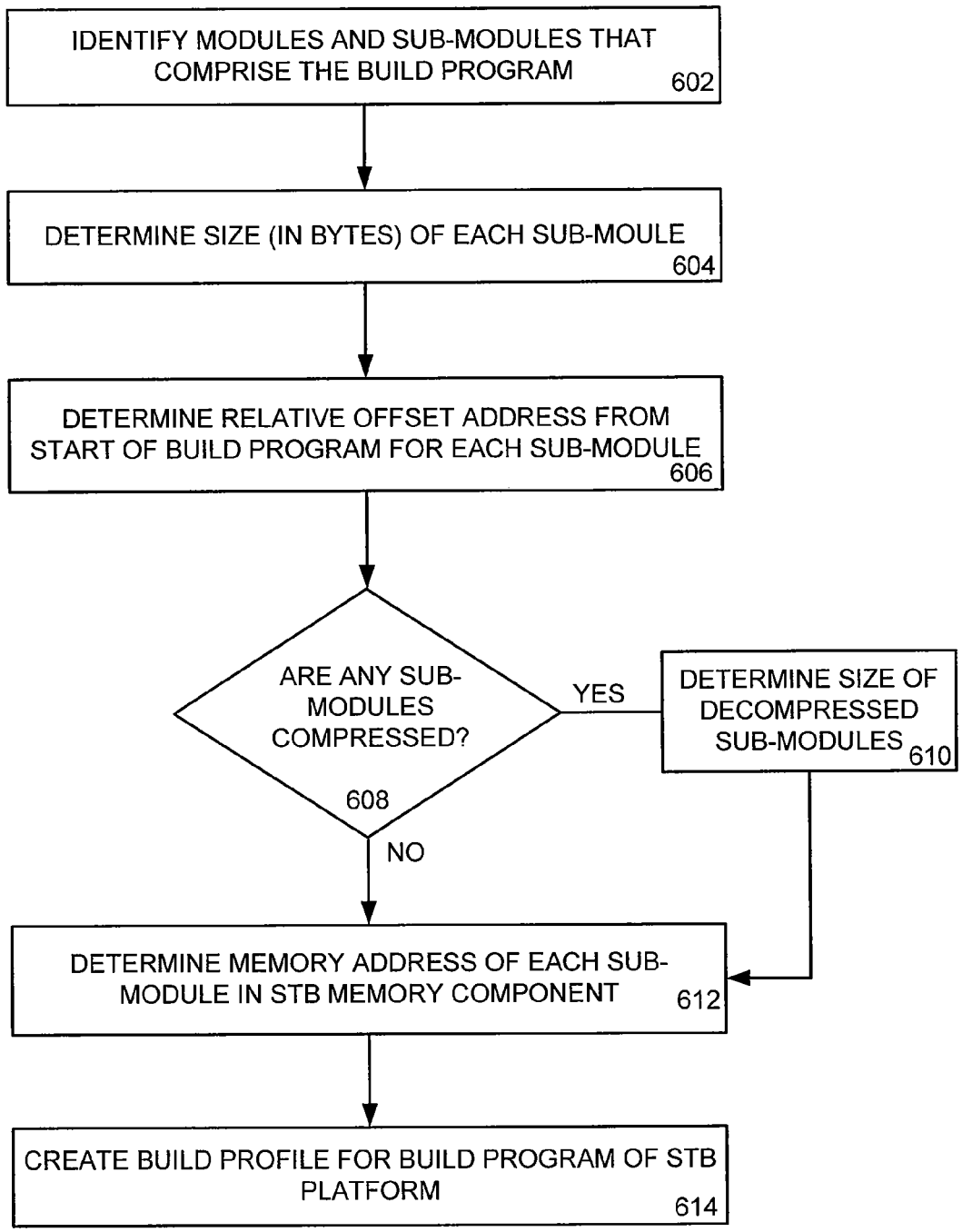
FIG. 6 is flowchart illustrating a method for creating a build profile of a build program for a particular platform of a set-top box of a satellite distribution system.

FIG. 6 is flowchart illustrating a method for creating a profile of a build program for a particular platform of a set-top box of a satellite distribution system. The method may be used to generate a build profile similar to the example shown in FIG. 5. While the operations of the method are described herein as performed by a computing device, it should be appreciated that the operations may also be performed by a computer programmer to generate or update a build program of a STB of a satellite distribution system.

The computing device may begin in operation 602 by identifying the modules and sub-modules that comprise the build program. Several examples of modules and sub-modules of a build program are illustrated above in the table of FIG. 5. However, it should be appreciated that the build program may include any number of modules and sub-modules. Once identified, the computing device may determine the size, in bytes, of each sub-module comprising the build program in operation 604. While the build profile generally contains the size of each sub-module in bytes, the size of the modules or sub-modules may be expressed in the build profile in any manner. For example, each sub-module may be measured in number of bits, lines of code or as a percentage of the total size of the build program. The information obtained in operation 604 may be included by the computing device into the build profile of the build program.

The computing device may then, in operation 606, determine the relative offset address from the beginning of the build program for each module and/or sub-module. In one example, the first sub-module of the build program has an offset address of 0, with each subsequent sub-module being located a particular memory address from the beginning of the build program. The relative offset address for each sub-module indicates the relative position of each of the sub-modules within the flash memory of the STB. The relative offset address for each sub-module may be included by the computing device into the build profile of the build program.

In operation 608, the computing device may determine whether the any of the sub-modules are compressed using a data compression algorithm. If it is determined that one or more sub-modules of the build program are compressed, then the computing device, in operation 610, may determine the size of the sub-modules after decompression of the data. As should be appreciated, decompression of the data of a sub-module may result in the sub-module occupying more area within memory. Thus, a particular module may have two sizes associated with the module, namely a compressed size and a decompressed size. Both sizes of the sub-module may be included in the build profile of the build program. Upon determination of the size of each decompressed sub-module, the method may continue onto operation 612, explained in more detail below.

If it is determined that no sub-modules are compressed, then the computing device may determine the memory address of each sub-module of the build program in the STB memory component in operation 612. As explained above, the build program may be loaded into one or more DRAM components of the STB from flash memory. Thus, in operation 612, the memory address for each sub-module when stored in DRAM may be determined by the computing device. In situations where the data is decompressed prior to storing in DRAM, the computing device may also determine the memory addresses of the decompressed sub-modules in operation 612.

In operation 614, the information gathered in the previous operations about the build program may be collected into a build profile by the computing device. The build profile may be generated and stored in any number of computer file types. For example, the information gathered about the build program may be stored as a table, such as shown in FIG. 5, and stored in a computer word processing file. In other embodiments, the information may be stored in a text file, such as an .ini file. Further still, the information gathered may be displayed graphically, either on a display device or in a graphic-based computer file. In still other embodiments, the information gathered about the build program may be stored in a data file such that the information may be parsed and accessed by a computing device quickly. Generally, the build profile may be stored in any manner that is accessible by the STB or other computing device when generating or updating a build program.

Once generated, the build profile may be utilized by a computer programmer or computing device in multiple ways. For example, when creating the build program, the build profile may be analyzed to determine whether the sub-modules that comprise the build program will fit within the available flash memory space. Further, if it is determined that some sub-modules will not fit within the allotted flash memory space, the computing device may then determine to utilize a data compression algorithm to compress one or more sub-modules such that the build program may be entirely stored in the flash memory. The computing device may also use the build profile to determine which of many data compression algorithms have been used to compress the sub-modules of the program, as well as determine if other data compression schemes would provide the adequate compression of the build program.

Further, because the build profile may contain information on where in the flash memory of the STB the build program is stored, information for each type of STB platform and device may be maintained and stored for future maintenance of the STBs of the satellite system. For example, a STB may fail to start-up when the device is first powered on. In this case, knowledge of the location of the boot program within the memory of the STB may enable a technician to analyze the memory components of the STB to determine if a physical failure of the memory devices has occurred. Thus, the information of the actual location of the build program in memory may aid the technician in locating the fault in the program. Such information may also be useful when adding new software, updating currently operating software or providing additional functionality is desired for the STBs of the system.

In addition, the build profile may be utilized by the STB when updating the build program of a STB connected to the satellite system. For example, a STB may receive an update to the build program over the satellite, from a server over a network connection or from a portable storage device. In one embodiment, the STB receives the entire updated build program and, once fully downloaded, loads the build program into the proper memory locations. However, in an alternate embodiment, the STB may receive only those modules or sub-modules that are to be added to the build program of the STB. In these situations, a build profile may be analyzed by the STB to determine how and where the updated modules are inserted into the build program.

Figure 7:
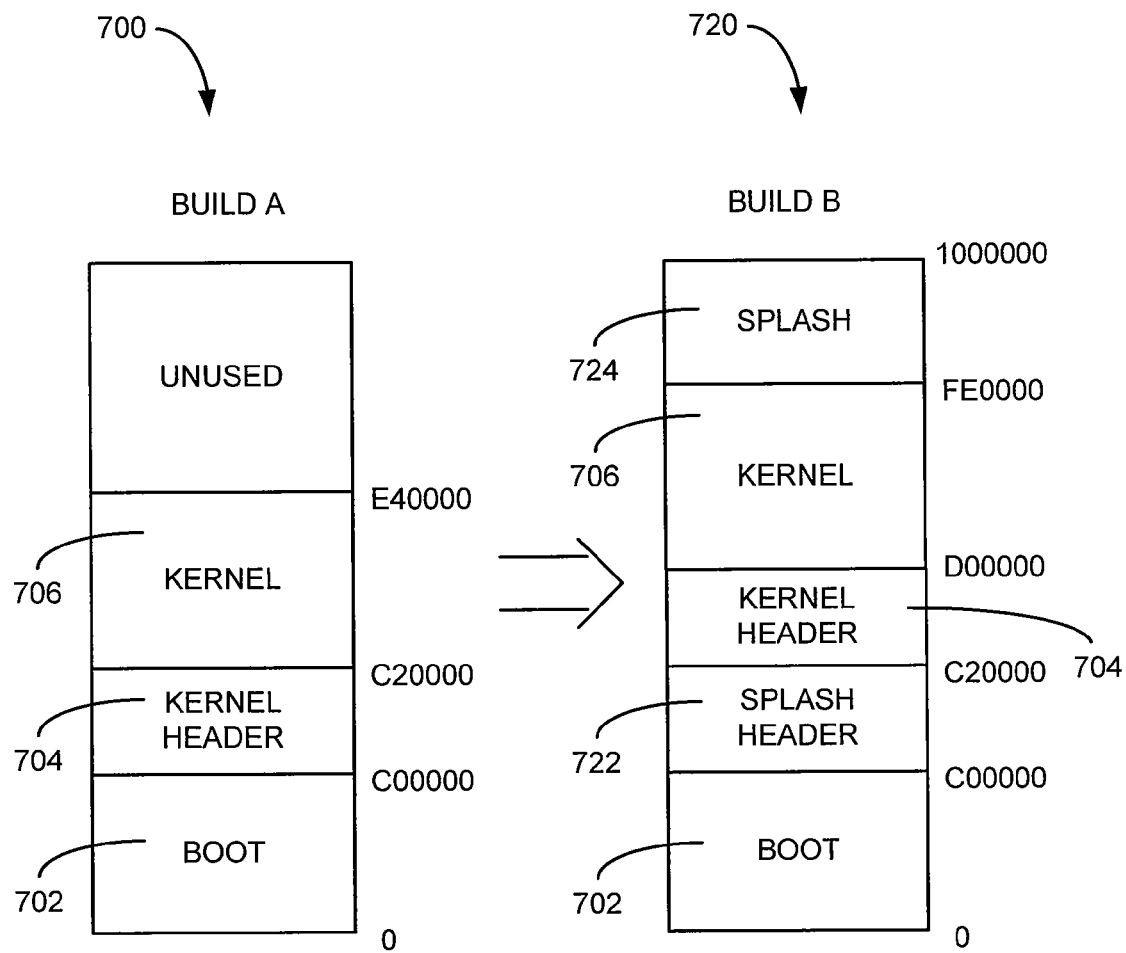
FIG. 7 is a block diagram of a build program updated to include a splash screen module, including the relative memory address offset for each module of the build program and updated build program.

FIG. 7 illustrates one example of updating a build program to include a splash screen module, including the relative memory address offset for each module of the build program and updated build program. In particular, Build A 700 represents the build program prior to updating, while Build B 720 represents the build program after the updated modules have been added to the build program.

As shown, Build A 700 includes three modules, namely a boot module 702, a kernel header 704 and a kernel module 706. In addition, a relative offset address position if provided for each module. Thus, the kernel header module 704 begins at offset position C00000 while the kernel module begins at offset position C20000. As indicated above, the modules of Build A 700 may include sub-modules that comprise the modules. Build A 700 may be stored in flash memory of DRAM memory of a STB for execution upon boot-up of the STB.

In addition, Build A 700 may be updated to include a splash screen feature that displays to the user while the STB is starting up. The splash screen feature may comprise two modules, a splash screen header module 722 and a splash screen module 724. Thus, to update the Build A 700, the two modules may be inserted into the build program, as shown in Build B 720.

In one embodiment, the build program is executed starting from the bottom of the build program. Thus, the boot module 702 is executed first, with the module following the boot module being executed following the boot module. To provide the splash screen to the user while the STB is starting up, it may be necessary to insert the splash screen header module 722 immediately after the boot module, such that the splash screen header and splash screen module 724 can be executed immediately following the boot module. However, the STB may not be aware of the location in memory of the boot module 702 such that the STB may not know where to insert the splash header 722 or splash module 724.

To provide the STB with the information on the proper location to store the splash header module 722 such that it is executed immediately after the boot module 702, the build profile of the build program may be consulted. Thus, the STB may analyze the build profile for that particular STB platform to determine where the boot module 702 ends. In this case, the boot module of the build program occupies relative offset addresses 0 to C00000. Therefore, the STB may be instructed to insert the splash header module beginning at offset address C00000 such that the splash header module is executed following the boot module. The insertion of the splash header module can be seen in Build B 720 of FIG. 7.

However, by inserting the splash header to immediately follow the boot module 702, the other modules of the build program must also be moved to provide space within the build program for the inserted modules. To move the modules of the build program, the STB may analyze the information contained within the build profile to determine the size of each module of the build program, as well as the current memory address for each module. After analysis, the STB may then properly reload the modules of the build program such that each module is loaded correctly into the memory of the STB. For example, the kernel header module 704 in Build B 720 is shifted to make room in memory for the splash header module 722, occupying address positions C20000 to D00000. Similarly, the kernel module 706 is also shifted to memory addresses D00000 to FE0000, with the splash screen module 724 appended to the end of the build program of Build B 720. In some instances, after analysis of the build profile, the STB may determine that some modules are not shifted in memory at all and the newly added modules are merely added to the build program around the non-shifted modules. Thus, the STB may utilize the build profile in many ways to determine how the build program is updated. In this manner, the STB may analyze the build profile of a build program to update the build program with one or more new modules.

It should be noted that the flowchart of FIG. 6 is illustrative only. Alternative embodiments of the present invention may add operations, omit operations, or change the order of operations without affecting the spirit or scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

What is claimed is:

1. A method for generating a build program to be stored beginning at a first memory address in a first memory component of a set-top box of a television system, the method comprising:

identifying a first software module and a second software module, wherein the build program for a set-top box includes the first software module and the second software module;

utilizing a first data compression technique to compress the first software module;

determining a first size of the first software module when compressed;

creating a build profile, the build profile indicating at least the first memory address,
a first offset address for the first software module, the first offset address being relative to the first memory address,
a second offset address for the second software module, the second offset address being relative to the first memory address,
the first size of the first software module, and
a second size of the second software module;

generating the build program based on the created build profile; and loading the build program beginning at the first memory address in the first memory component of the set-top box.

2. The method of claim 1 wherein the build profile further indicates
a second memory address for the first software module, the second memory address corresponding to an address in the first memory component of the set-top box.

3. The method of claim 1 wherein identifying the first software module comprises:
determining a size of the first software module when uncompressed; and
determining whether the first software module includes a plurality of submodules.

4. The method of claim 1 wherein the first software module comprises one or more sub-modules and wherein the build profile further indicates
a relative offset address for each of the one or more sub-modules, the relative offset address being relative to the first memory address, and
a size for each of the one or more sub-modules, the size being in bytes.

5. The method of claim 2 further comprising:
determining a third memory address for the first software module, the third memory address being an address in a second memory component.

6. The method of claim 5 further comprising:
utilizing a second data compression technique to compress the second software module,
wherein the build profile further indicates the first software module as being compressed with the first data compression technique and the second software module as being compressed with the second data compression technique.

7. The method of claim 1 wherein loading the build program comprises:

writing the build program into a flash memory component of the set-top box.

8. The method of claim 1 wherein loading the build program further comprises:
writing the software module to a dynamic random access memory component of the set-top box in accordance with the second memory address for the first software module indicated in the build profile.

9. The method of claim 7 further comprising:
writing the build program from the flash memory component of the set-top box to the second memory component of the set-top box.

10. The method of claim 1 wherein the build profile comprises a computer-readable text file.

11. A method for updating a build program stored in a first memory component of a set-top box, the method comprising:
storing a build program in the first memory component of the set-top box, the build program including a plurality of software modules, the build program being configured to provide at least a boot protocol for the set-top box;
generating a build profile for the build program, the build profile indicating
a first memory address,
for each of the plurality of software modules, an offset memory address, the offset memory address being relative to the first memory address, and
for each of the plurality of software modules, a size of the software module;
storing the build profile in a storage location in the set-top box;
receiving an update to the build program, the update comprising one or more new software modules, each of the one or more new software modules having a size in bytes;
retrieving the stored build profile;
updating the build program with the one or more new software modules based on the retrieved build profile; and
updating the build profile to at least indicate the size of each of the one or more new software modules.

12. The method of claim 11 wherein the build profile further indicates
for each of the one or more software modules, an absolute memory address, the absolute memory address corresponding to an address in a second memory component.

13. The method of claim 11 wherein the build profile further indicates
a compression method used to compress at least one of the one or more software modules.

14. The method of claim 11 wherein the build profile further indicates
one or more sub-modules included in the one or more software modules.

15. The method of claim 11 wherein updating the build program comprises:
analyzing the build profile to determine a new offset memory address for each of the one or more new software modules; and
inserting each of the one or more new software modules into the build program at the determined new offset memory address.

16. The method of claim 11 wherein the build program and the update to the build program are received from a server in a satellite television system.

17. A system for updating a current build program of a receiver, the system comprising:

a headend configured to provide an update of the current build program to the receiver, the update including a plurality of new software modules;
the receiver including a processor, the receiver configured to receive the update of the current build program over a satellite network from the headend; and
a computer-readable storage medium coupled to the processor included in the receiver, the computer-readable storage medium configured to store a machine-executable code that, when executed by the processor in the receiver, causes the receiver to perform the operations of:
receiving the update of the current build program;
retrieving a stored build profile, the stored build profile indicating
identifiers of a plurality of current software modules included in the current build program,
a first memory address,
for each of the plurality of current software modules included in the current build program, an offset memory address, the offset memory address being relative to the first memory address, and
for each of the plurality of current software modules included in the current build program, a size of the current software module;
generating an updated build profile based on information about the update to the current build program, the updated build profile indicating
for each of the plurality of new software modules, a new offset memory address, the new offset memory address being relative to the first memory address, and
for each of the plurality of new software modules, a new size of the new software module; and
updating the build program of the receiver based on the updated build profile.

18. The system of claim 17 wherein the computer-readable storage medium comprises at least one of a flash memory component and a dynamic random access memory component.

19. The system of claim 17 wherein the receiver is further configured to perform the operations of:
utilizing a data compression technique to compress one of the plurality of new software modules, wherein the updated build profile further indicates that the one of the plurality of new software modules is compressed by the data compression technique.

20. A method for generating a build program to be stored at a first memory address in a first memory component of a set-top box of a television system, the method comprising:
identifying a first software module and a second software module for inclusion in the build program for the set-top box;
compressing the first software module with a first data compression technique;
compressing the second software module with a second data compression technique;
creating a build profile indicating
the first memory address,
a first offset address for the first software module, the first offset address being relative to the first memory address,
a first absolute memory address for the first software module, the first absolute memory address corresponding to an address in the first memory component of the set-top box, a second memory address for the first software module, the second memory address corresponding to an address in a second memory component of the set-top box, that the first software module has been compressed by the first data compression technique, and that the second software module has been compressed by the second data compression technique;

generating the build program based on the created build profile; and loading the build program into the first memory component of the set-top box.

21. The method as claimed in claim 20, wherein the first memory component of the set-top box is a flash memory component.

22. The method as claimed in claim 20 further comprising subsequent to loading the build program, updating the build profile; and storing the updated build profile in a storage location.

* * * * *